United States Patent

Mullen

[15] 3,635,836

[45] Jan. 18, 1972

[54] THICKENED COMPOSITIONS AND THE PROCESS OF PREPARING SAME

[72] Inventor: Joseph D. Mullen, Golden Valley, Minn.
[73] Assignee: General Mills, Inc., Minneapolis, Minn.
[22] Filed: Nov. 10, 1969
[21] Appl. No.: 875,511

[52] U.S. Cl. ..................................252/316, 8/79, 8/DIG. 3, 106/161, 134/4, 252/79.1, 252/79.2, 252/79.3, 252/79.4, 252/82, 252/87, 252/144, 252/145, 252/DIG. 8
[51] Int. Cl. .....................B01j 13/00, C11d 7/08, C11d 7/50
[58] Field of Search ..................252/316, 144, 145; 106/161

[56] References Cited

UNITED STATES PATENTS

| | | | |
|---|---|---|---|
| 924,057 | 6/1909 | Goldsmith | 106/161 |
| 1,143,111 | 6/1915 | Ellis | 252/144 |
| 1,985,631 | 12/1934 | Davidson et al. | 106/154 |
| 2,561,333 | 7/1951 | Beckel et al. | 252/316 X |
| 2,629,696 | 2/1953 | Dodd et al. | 262/316 X |

*Primary Examiner*—Richard D. Lovering
*Attorney*—Anthony A. Juettner and Gene O. Enockson

[57] ABSTRACT

Thickened compositions comprising about 1.5 to 20 percent of particulate proteinaceous material obtained from legume seeds, about 20.0 to 55.0 percent of a protic acid and about 40.0 to 75.0 percent of a thickening component which is water, an alkanol, an alkylcarbonyl compound or mixtures thereof. Process for preparing such compositions.

12 Claims, No Drawings some purposes, however, this extraneous material may be undersirable. On the other hand, protein concentrates and isolates are presently more expensive than ground seeds or seed flours.

The thickening component in the system includes water, alkanols, and alkylcarbonyl compounds. Useful alkanols are mono- and polyhydroxy alcohols including: methanol, ethanol, glycol, propanol, glycerol, propylene glycol, butanol, pentanol, hexanol, heptanol, octanol, nonanol, decanol, and their cyclic or branched counterparts such as cyclohexanol. Useful alkanones are mono- and polycarbonyl ketones including: acetone, propanone, butanone, pentanone, hexanone, heptanone, octanone, nonanone, decanone and their branched or cyclic counterparts thereof such as cyclohexanone. Useful alkanals are mono- and polycarbonyl aldehydes including: methanal, ethanal, propanal, butanal, pentanal, hexanal, heptanal, octanal, nonanal, decanal, and their branched counterparts. It is preferred that the useful alkanols and alkylcarbonyl compounds contain 10 or less carbon atoms.

As described above, additional acidic and neutral constituents can be incorporated into the dispersions by way of the thickening component. Included among these added constituents are the mineral acids, haloalkanes, inorganic salts and polymeric compositions.

Mineral acids such as hydrochloric, sulfuric, phosphoric and nitric acid can readily be added. The amount of mineral acid that can be included depends upon the concentration of protein used in the system and the particular mineral acid. The effect of legume seed protein and mineral acid concentrations upon thickening o the dispersion is shown in example IV.

Inorganic salts of mono, di and trivalent metals can also be added. Salts such as sodium chloride, calcium chloride and aluminum chloride are well known as protein precipitating agents. Salts added in amounts of 0.25 to 1 percent by weight of the total composition increase the gel yield value. At concentrations above about 4 percent by weight of the composition, these salts tend to decrease the solubility of the protein and weaken its thickening and gelling capacity.

Heloalkanes such as methylene chloride, ethylene bromide, propylene bromide and high molecular weight halogenated alkanes can be added.

Polymeric materials such as vinyl polymers with carboxyl substitution groups can be added, not only to provide constituents which can react with a given surface but also to control or modify the viscosity and yield value of the dispersion.

The following examples are illustrative of the invention.

EXAMPLE I

This example illustrates the use of soybean flour (approximately 50 percent protein by weight) as the source of legume seed protein in conjunction with different protic acids of this invention and thickening components.

Seven and one-half grams of soybean flour, manufactured by Central Soya, Inc. and sold under the trade name Hizyme, was dispersed in 42.5 grams of the selected protic acid shown in column A. Fifty grams of the thickening component shown in Column B were added. A description of the compositions obtained is shown in column C.

| | Column | | |
|---|---|---|---|
| | A | B | C |
| Sample | Protic acid | Thickening component | Results |
| 1 | Formic acid (88% by weight in water). | Water | Gel formed immediately. |
| 2 | Phenol (92%) (8% water as liquifying agent). | Methanol | A very viscous-tacky mass formed. |
| 3 | Non-aqueous m-cresol | Water | Do. |
| 4 | do | Ethanol | A very viscous-tacky mass formed, gelled after one hour. |
| 5 | Trifluoroacetic | Water | A very viscous mass formed. |
| 6 | Formic acid (88%) | 2-propanol | Gel. |
| 7 | Acetic acid | Water | A very viscous mass formed. |
| 8 | Formic acid (88%) | n-Hexanol | Very viscous. |
| 9 | do | n-Octanol | Very viscous, gel in one hour. |
| 10 | do | n-Decanol | Do. |
| 11 | do | Acetone | Gel. |

The product of sample 1 was melted by heating to a temperature of 50° C. and regelled by cooling to a temperature of 30° C. and regelled by cooling to a temperature of 30° C. Yield and viscosity did not change during four heating and cooling cycles.

EXAMPLE II

Following the procedure of example I, a very viscous composition of 22 percent trifluoroacetic acid by weight of the total composition, 7.5 percent soy flour by weight of the total composition and 70.5 percent water by weight of the total composition was prepared.

EXAMPLE III

This example illustrates the use of soy protein isolate (90percent by weight protein on an 8 percent water basis) as the source of the legume seed protein.

Five grams of isolated soy protein manufactured by Central Soya Inc. sold under the trade name Promine D was dispersed in 45 grams of commercial formic acid (88percent by weight in water). Fifty grams of water or alkanol was added with the results also shown below:

| | | Result | after 5-minute standing | |
|---|---|---|---|---|
| Sample | Thickening Agent | Yield value dynes/cm.$^2$ | Viscosity (poise) | Description |
| 1 | Water | 1200 | 21 | gel |
| 2 | Glycerol | 6500 | 280 | gel |
| 3 | Methanol | 3500 | 64 | gel |
| 4 | Ethanol | 150 | 10 | gel (became much firmer after standing 1 hour.) |

The viscosity was measured with a Haake ROTOVISCO Viscometer. It is well known that viscosity and shear measurements are relative values and duplication is seldom achieved when using different types of instruments. Using the Haake ROTOVISCO, the measurement was made by putting a given amount of teat material in a cup and inserting a bulb. The shear rate used was 17.8/sec. The yield value (dynes/cm.$^2$) is a measurement of the force necessary to start the bulb rotating. The viscosity (poise) is a measurement of the force to keep the bulb rotating.

EXAMPLE IV

This example illustrates the inclusion of mineral acids in the water component added to the selected protic acid-proteinaceous material dispersions.

Soybean flour was dispersed in commercial formic acid (88) as described in example I. The mineral acids shown below were included in the water component to produce

THICKENED COMPOSITIONS AND THE PROCESS OF PREPARING SAME

This invention relates to thickened compositions and to the processes of preparing same. More particularly it relates to viscous or gelled acid dispersions comprising a selected protic acid. Particulate proteinaceous material derived from legume seeds or cottonseeds, and a thickening component composed of water, alkanols, alkylcarbonyl compounds or combinations thereof. The thickening component can contain additional neutral and acidic constituents.

Heretofore, selected plant and microbial gums have been almost the sole means of thickening highly acidic systems. For example, guar gum is used to thicken hydrochloric acid and hydrofluoric acid solutions in the acidification of oil wells. Gums, however, are costly to manufacture. Hence, their use is limited. The proteinaceous material of the present invention, on the other hand, can be manufactured using relatively simple processing and inexpensive starting materials.

Broadly, the viscous and gelled dispersions of the present invention are useful for applying strongly acid films to surfaces of metal, stone, ceramic, textile or wooden articles for the purpose of treating the surface. Once the treatment has been completed the dispersions can be washed off.

The application of the selected protic acids of this invention to selected surfaces has many beneficial functions. Phenol and m-cresol are disinfectants. Formic acid is used to swell wool prior to dyeing. Hydrofluoric acid is used for etching and frosting glass, pickling copper, brass, stainless steel and other alloy steels, and cleaning stone and brick. Acetic acid treatment is used in the dyeing of silk and the printing of calico. Dichloro and trichloracetic acids are useful as decalcifiers. Trifluoroacetic acid is a strong nonoxidizing acid used as a decalcification and pickling agent.

In addition to the selected protic acids of this invention, other acidic and neutral constituents can be incorporated into the dispersions. Included among these are mineral acids at high concentrations. When the dispersions contain mineral acids, the dispersions can be sprayed onto metal surfaces and perform as pickling agents without actually immersing the article. They can also be used as plumbing cleaners. Other materials that can be added are haloalkanes. When methylene chloride is added to the dispersion, the viscous mass is an excellent paint remover. The selection of acidic and neutral materials that can be added to these dispersions is very wide and is determined by the particular end use intended.

The composition of the thickened dispersions comprises:

About 1.5 to 20.0 percent particulate proteinaceous material derived from legume seed or cottonseed by weight of the total composition;

About 20.0 to 55.0 percent protic acid by weight of the total composition; and

About 40.0 to 75.0 percent water, alkanol or alkylcarbonyl compounds by weight of the total composition, wherein the water, alkanol or alkylcarbonyl compound can contain additional acidic or neutral constituents, the weight of which is included in the weight of the water, alkanol or alkylcarbonyl compound.

When the composition are actually gelled, the dispersions are thixotropic plastics which melt upon heating and form gels again upon cooling. The melting points of the individual gels are related to the protein level and the presence of additives. Generally, higher levels of proteinaceous material result in higher melting points. When the compositions are only somewhat gelled, the dispersions are viscous syrups.

The thickened dispersions of this invention are made by dispersing a particulate proteinaceous material derived from legume seed or cottonseed in a selected protic acid, solvating a portion of the protein and then converting the solvated protein into a less solvated condition. Either of two procedures can be used to produce the thickening of the dispersions.

In the first procedure the particulate proteinaceous material is mixed with the selected protic acid solution in which the selected protic acid concentration is above about 60 percent by weight of the solution until all or at least a substantial part of the proteinaceous material has dispersed and a portion has solvated. A thickening component composed of water, alkanol or alkylcarbonyl compound is then added and a marked increase in viscosity or gelation takes place. In some instances gelation occurs immediately. In other instances, a period of a few hours is necessary.

In additional acidic or neutral constituents, which it may be desirable to incorporate into the dispersion, are dissolved in the thickening component prior to adding the thickening component to the selected protic acid proteinaceous material dispersion.

In the second procedure, the selected protic acid, the thickening component and the proteinaceous material are combined in proportions so that the concentration of the selected protic acid is from 20 percent to 55 percent by weight of the total composition. The mixture is heated to a temperature above about 80 C. The composition is then cooled. Thickening or gelation occurs at temperatures below the 50° C.

Certain protic acids have been found to be useful in treating proteins to made thickened compositions. These acids include hydrofluoric, formic, acetic, dichloroacetic, trichloroacetic, trifluoroacetic, phenol and m-cresol. These acids are listed as a class of "strong protic acids" by S. J. Singer in "Advances in Protein Chemistry," volume 17, pg. 6, These specific acids are considered strong in a broad relative sense; i.e., compared to a class of "weak protic acids" whose 1 M solutions have a pH between 6 and 8. The mechanism whereby these strong protic acids dissolve or disperse proteins is not clearly understood. Singer, on pg. 49, considers several factors which may be involved. For the purposes of this invention the mechanism need not be considered. It should be understood that the effect is not merely due to pH, but other factors are involved.

Ordinarily the present invention can be practices using ordinary glass or ceramic ware. When hydrofluoric acid is involved, however, it is necessary to use containers made of inert material such as polyethylene or waxed containers and provide adequate ventilation. Trifluoro, trichloro and dichloroacetic acids are extremely reactive acids. Appropriate safety measures that are normally used with these acids should be taken. When formic acid, acetic acid, phenol and m-cresol are used, the process can be conducted with relative ease.

As little as 1.5 percent proteinaceous material by weight of the total composition will produce thickening of the dispersion. Immediate gelation is usually achieved when about 3.5 percent proteinaceous material by weight of the total composition is used. When the proteinaceous material concentration is over about 20 percent by weight of the total composition, the bulk of the material creates a viscosity by itself without adding a thickening component. At these concentrations the dispersion is a heterogeneous paste which is difficult to manipulate in operations such as spraying and does not react in a uniform manner. In most operations the preferred concentration range of the proteinaceous material is from 5 to 12 percent by weight of the total composition.

The proteinaceous material useful in this invention is derived from legume seeds or cottonseed. It can be in the form of protein isolates and concentrates, legume or cottonseed flours or ground legume seeds. Soybean and peanut protein isolates contain more than 90 percent protein by weight. Protein concentrates contain as much as 70 percent protein by weight. Soybean flour contains about 47.5 to 54.5 percent by weight, peanut flour about 47.5 percent protein by weight, lima bean flour about 21.5 percent by weight and cottonseed flour about 42 to 47 percent protein by weight. The selection of ground seeds, flours, protein concentrates or protein isolates as the starting material is determined by the particular end use for which the viscous or gelled acid system is intended. When ground seeds or flours are used, extraneous material composed of the nonprotein portions of the seed, such as fibers and carbohydrates, are present in the dispersion. These materials do not greatly interfere with the system. For thickened system having the composition and character also shown below:

| Mineral acid | Weight percent | | | | |
|---|---|---|---|---|---|
| | Mineral acid | Soy flour | Formic acid (88% by wt. in water) | Water | Results |
| $H_3PO_4$ | 5.0 | 7.5 | 37.5 | 50.0 | Gel. |
| $H_3PO_4$ | 15.0 | 7.5 | 37.5 | 40.0 | Gel. |
| HCl | 2.5 | 7.5 | 37.5 | 52.5 | Gel. |
| HCl | 5.0 | 7.5 | 37.5 | 50.0 | Gel. |
| HCl | 7.5 | 7.5 | 37.5 | 47.5 | Very viscous. |
| $H_2SO_4$ | 2.5 | 10.0 | 35.2 | 52.3 | Gel. |
| $H_2SO_4$ | 5.0 | 10.0 | 35.2 | 49.8 | Gel. |
| $H_2SO_4$ | 10.0 | 10.0 | 35.2 | 44.8 | Gel. |
| $H_2SO_4$ | 20.0 | 10.0 | 35.2 | 34.8 | Gel. |
| $HNO_3$ | 10.0 | 7.5 | 37.5 | 45.0 | Gel. |
| $HNO_3$ | 18.0 | 7.5 | 37.5 | 39.0 | Viscosity increase. |

EXAMPLE V

This example illustrates the use of the ground legume seed as the source of the proteinaceous material Seven and one-half grams of ground dried peas (25 percent protein by weight on a 10 percent water basis) were dispersed in 42.5 grams of commercial formic acid (88 percent). Methanol was added in the following weight ratios:

| Pea-formic acid/ methanol by weight | Immediate result | Result after three hours |
|---|---|---|
| 1:1 | Very viscous | Gel. |
| 1.5:1 | do | Gel. |
| 2.3:1 | Gelled immediately | Gel. |

EXAMPLE VI

This example illustrates the use of peanut protein isolate (90 percent protein by weight on an 8 percent water basis as the source of the proteinaceous material.

Seven and one-half grams of peanut protein isolate manufactured by Gold Kist Peanut Growers was dispersed in 42.5 grams of commercial formic acid (88 percent.) Fifty grams of ethanol was added to the dispersion. A gel formed immediately.

EXAMPLE VII

This example illustrates the use of cottonseed flour (42 percent protein by weight on an 8 percent water basis) as the source of the proteinaceous material.

Seven and one-half grams of cottonseed flour was dispersed in 42.5 grams of commercial formic acid (88 percent.) Fifty grams of ethanol was added to the dispersion. A gel formed after a 2-hour period.

EXAMPLE VIII

This example illustrates the addition of neutral constituents to a typical dispersion.

A dispersion was made having the following composition:

| % by wt. of the Total composition | Constituents |
|---|---|
| 5% | Soy flour |
| 35% | Formic acid |
| 35% | Water |
| 25% | Methylene chloride |

The procedure employed involved dispersing soy flour in formic acid (88 percent), mixing the methylene chloride with water and adding the methylene chloride-water mixture to the formic acid-soy flour dispersion.

When this composition was applied to a painted surface, the paint was softened and could be easily removed.

EXAMPLE IX

This example illustrates the effect of polymeric materials in the acid dispersions.

Following the procedure of example I, sample 1, 0.25 grams of vinyl polymers with carboxyl substitution groups sold under the trade name of Carbopols and manufactured by B. F. Goodrich Co., was added to the soy flour. The viscosity of the gel was increased 100 percent and the gel yield value 70 percent over the values of the formic acid-soy flour-water dispersion.

The embodiments of the invention in which an exclusive property or privilege is claimed are defined as follows:

1. A thickened composition consisting essentially of
   about 1.5 percent to 20.0 percent particulate proteinaceous material derived from legume seeds or cottonseed by weight of the total composition;
   about 20.0 percent to 55.0 percent protic acid selected from the group consisting of hydrofluoric acid, formic acid, acetic acid, dichloroacetic acid, trichloroacetic acid, trifluoroacetic acid, phenol, m-cresol and mixtures thereof by weight of the total composition; and
   about 40.0 percent to 75.0 percent thickening component selected from the group consisting of water, alkanol, alkanal, alkanone, and mixtures thereof by weight of the total composition, said thickening component containing 10 or less carbon atoms.

2. A thickened composition as recited in claim 1 wherein said proteinaceous material is derived from soybean.

3. A thickened composition as recited in claim 1 wherein said proteinaceous material is derived from peas.

4. A thickened composition as recited in claim 1 wherein said proteinaceous material is derived from peanuts.

5. A thickened composition as recited in claim 1 wherein said proteinaceous material is derived from beans.

6. A thickened composition as recited in claim 1 wherein said proteinaceous material is derived from cottonseed.

7. A thickened composition as recited in claim 1 wherein said thickening component includes a mineral acid.

8. A thickening composition as recited in claim 1 wherein:
   said proteinaceous material is soy protein;
   said protic acid is formic acid; and
   said thickening component is water.

9. A thickened acid composition as recited in claim 8 wherein said thickening component includes a mineral acid.

10. A process for preparing a thickened acid composition comprising the steps of:
    dispersing proteinaceous material derived from legume seeds and cottonseed in the amount of about 1.5 to 20 percent by weight of the total final composition in a solution of a protic acid in a solvent therefor, said protic acid being selected from the group consisting of solutions of hydrofluoric acid, formic acid, acetic acid, dichloroacetic acid, trichloroacetic acid, trifluoroacetic acid, phenol and m-cresol in which said protic acid concentration is above 60 percent by weight of the solution and about 20.0 to 55.0 percent by weight of the total final composition; and
    adding a thickening component in amounts of about 40.0 to 71.0 percent of the total final composition, said thickening component containing 10 or less carbon atoms and being selected from the group consisting of water, alkanol, alkanal, alkanone and mixtures thereof.

11. A process for preparing thickened acid compositions as recited in claim 10, wherein the thickening component includes a mineral acid.

12. A process for preparing thickened acid compositions comprising the steps of:
    combining about 1.5 to 20 percent particulate proteinaceous material derived from legume seeds or cottonseed by weight of the total composition, about 20.0 to 55.0 percent protic acid selected from the group consisting of hydrofluoric acid, formic acid, acetic acid, dichloroacetic acid, trichloroacetic acid, trifluoroacetic acid, phenol m-cresol and mixtures thereof by weight of the total composition and about 40.0 to 71.0 percent thickening component selected from the group consisting of water, alkanol, alkanal, alkanone and mixtures thereof by weight of the total composition, said thickening component containing ten or less carbon atoms;
    heating said combined constituents to a temperature above about 80° C.; and
    cooling said combined constituents to a temperature below about 50° C.

* * * * *

PO-1050
(5/69)

UNITED STATES PATENT OFFICE
CERTIFICATE OF CORRECTION

Patent No. 3,635,836          Dated January 18, 1972

Inventor(s) Joseph D. Mullen

It is certified that error appears in the above-identified patent and that said Letters Patent are hereby corrected as shown below:

Column 1, line 50, ":" should read -- ; --; line 59, "composition" should read -- compositions --. Column 2, line 8, "In" should read -- The --; line 18, "80 C." should read -- 80°C. --; line 19, "below the" should read -- below about --; line 22, "made" should read -- make --; line 26, "pg. 6, These" should read -- pg. 6. These --; line 36, "practices" should read -- practiced --; line 65, "percent by" should read -- percent protein by --. Column 3, line 50, "thickening o the" should read -- thickening of the --; line 59, "Heloalkanes" should read --Haloalkanes --. Column 4, line 23, delete "and regelled by cooling to a temperature of 30°C."; line 64, "teat" should read -- test --; line 76, "(88)" should read -- (88%) --. Column 5, line 35, "basis as" should read -- basis) as --. Column 6, line 34, "thickening" should read -- thickened --; line 49, "above 60" should read -- above about 60 --.

Signed and sealed this 11th day of July 1972.

(SEAL)
Attest:

EDWARD M.FLETCHER,JR.        ROBERT GOTTSCHALK
Attesting Officer            Commissioner of Patents